United States Patent
Metschan

(10) Patent No.: US 10,850,489 B2
(45) Date of Patent: *Dec. 1, 2020

(54) SYSTEMS AND METHODS FOR CONSTRUCTING COMPLEX COMPOSITE STRUCTURES

(71) Applicant: The Boeing Company, Chicago, IL (US)

(72) Inventor: Stephen Lee Metschan, Black Diamond, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/433,466

(22) Filed: Jun. 6, 2019

(65) Prior Publication Data

US 2019/0299581 A1 Oct. 3, 2019

Related U.S. Application Data

(63) Continuation of application No. 15/198,276, filed on Jun. 30, 2016, now Pat. No. 10,350,866, which is a continuation of application No. 14/204,254, filed on Mar. 11, 2014, now Pat. No. 9,399,338.

(51) Int. Cl.
  *B32B 37/02* (2006.01)
  *B29C 70/38* (2006.01)
  *B32B 38/18* (2006.01)

(52) U.S. Cl.
  CPC .............. *B32B 37/02* (2013.01); *B29C 70/38* (2013.01); *B32B 38/18* (2013.01); *B32B 2605/18* (2013.01)

(58) Field of Classification Search
  CPC ..... B32B 37/02; B32B 38/18; B32B 2605/18; B29C 70/38
  See application file for complete search history.

(56) References Cited

U.S. PATENT DOCUMENTS

| | | | |
|---|---|---|---|
| 4,767,321 A | 8/1988 | Chilva | |
| 5,213,646 A | 5/1993 | Zsolnay et al. | |
| 6,607,626 B2 | 8/2003 | Taggart | |
| 7,137,182 B2 | 12/2006 | Nelson | |
| 7,213,629 B2 | 5/2007 | Ledet et al. | |
| 7,763,138 B2 | 7/2010 | Pfitzner et al. | |
| 7,766,063 B2 | 8/2010 | Lauder et al. | |
| 7,811,401 B2 | 10/2010 | Anderson et al. | |
| 7,824,512 B2 | 11/2010 | Lauder et al. | |
| 8,336,596 B2 | 12/2012 | Nelson et al. | |
| 8,424,580 B2 | 4/2013 | Anderson et al. | |
| 8,578,995 B2 | 11/2013 | Nelson | |
| 9,399,338 B1 * | 7/2016 | Metschan | B29C 70/38 |
| 2010/0006205 A1 | 1/2010 | McCowin et al. | |

(Continued)

*Primary Examiner* — Jeffry H Aftergut
(74) *Attorney, Agent, or Firm* — Dascenzo Gates Intellectual Property Law, P.C.

(57) ABSTRACT

Systems for constructing complex composite structures include a conveyor and two or more stations operatively and sequentially positioned relative to the conveyor. Each station is configured to operatively deposit a layer of composite material on the conveyor. Methods of constructing a complex composite structure include laying up a first layer of composite material having a first configuration and laying up a second layer of composite material having a second configuration at least partially over the first layer.

20 Claims, 7 Drawing Sheets

(56) References Cited

U.S. PATENT DOCUMENTS

2011/0277935 A1 11/2011 Borgmann et al.
2013/0032287 A1 2/2013 Hagman et al.
2013/0118683 A1 5/2013 Nelson et al.

* cited by examiner

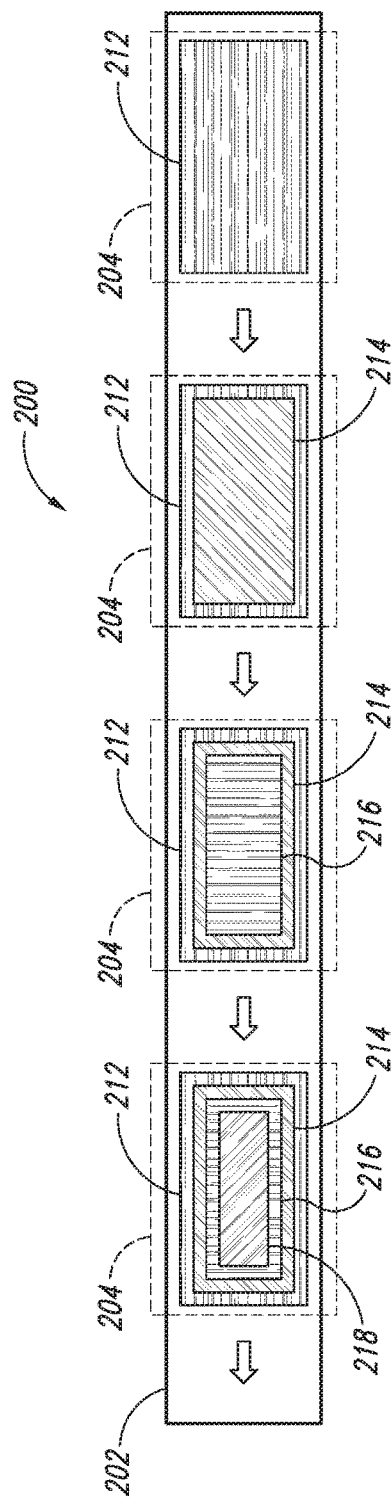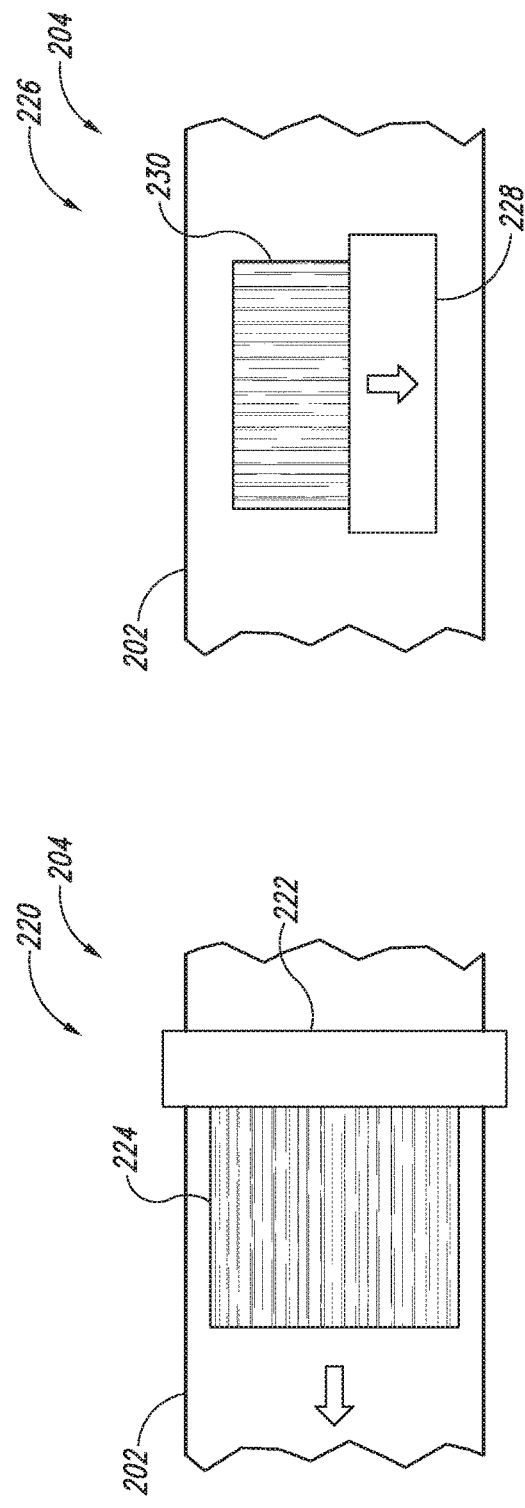

US 10,850,489 B2

SYSTEMS AND METHODS FOR CONSTRUCTING COMPLEX COMPOSITE STRUCTURES

RELATED APPLICATION

This application is a continuation of and claims priority to U.S. patent application Ser. No. 15/198,276, entitled "SYSTEMS AND METHODS FOR CONSTRUCTING COMPLEX COMPOSITE STRUCTURES," filed on Jun. 30, 2016, which is a continuation of and claims priority to U.S. patent application Ser. No. 14/204,254, entitled "SYSTEMS AND METHODS FOR CONSTRUCTING COMPLEX COMPOSITE STRUCTURES," filed on Mar. 11, 2014, and the complete disclosures of which are incorporated herein by reference.

FIELD

The present disclosure relates to the construction of complex composite structures.

BACKGROUND

Existing technologies for constructing simple composite structures are not adequate to support the efficient construction of larger, complex composite structures. Current lamination equipment can be limited when the same lamination head is used to sequentially layup multiple geometries, angles, and sizes of layers into a three-dimensional contour. For example, some technologies rely on a lamination head that moves in three dimensions relative to a cure tool, or cure mandrel, and deposits composite material on the cure tool as it moves in a programmed fashion around the cure tool.

SUMMARY

Methods and systems for constructing complex composite structures are disclosed herein. The disclosed methods and systems may be used to create generally flat layups of composite material "off tool," with the layups then being transferred to a cure tool for subsequent curing and assembly with other components. Accordingly, methods and systems according to the present disclosure may not rely on a cure tool being available, and instead the cure tool can be used more efficiently, resulting in reduced assembly times and reduced costs associated with construction of composite structures and apparatuses.

Example systems according to the present disclosure include a conveyor and two or more stations operatively and sequentially positioned relative to the conveyor. Each station is configured to operatively deposit a layer of composite material on the conveyor. Various illustrative and non-exclusive examples of suitable stations that may be incorporated into such a system are disclosed herein.

BRIEF DESCRIPTION OF THE DRAWINGS

FIG. 3 is a schematic diagram representing systems for laying up complex composite plies.

FIG. 4 is a schematic diagram representing an illustrative, non-exclusive example of a station for laying up a composite layer.

FIG. 5 is a schematic diagram representing another illustrative, non-exclusive example of a station for laying up a composite layer.

DESCRIPTION

Figure 1:
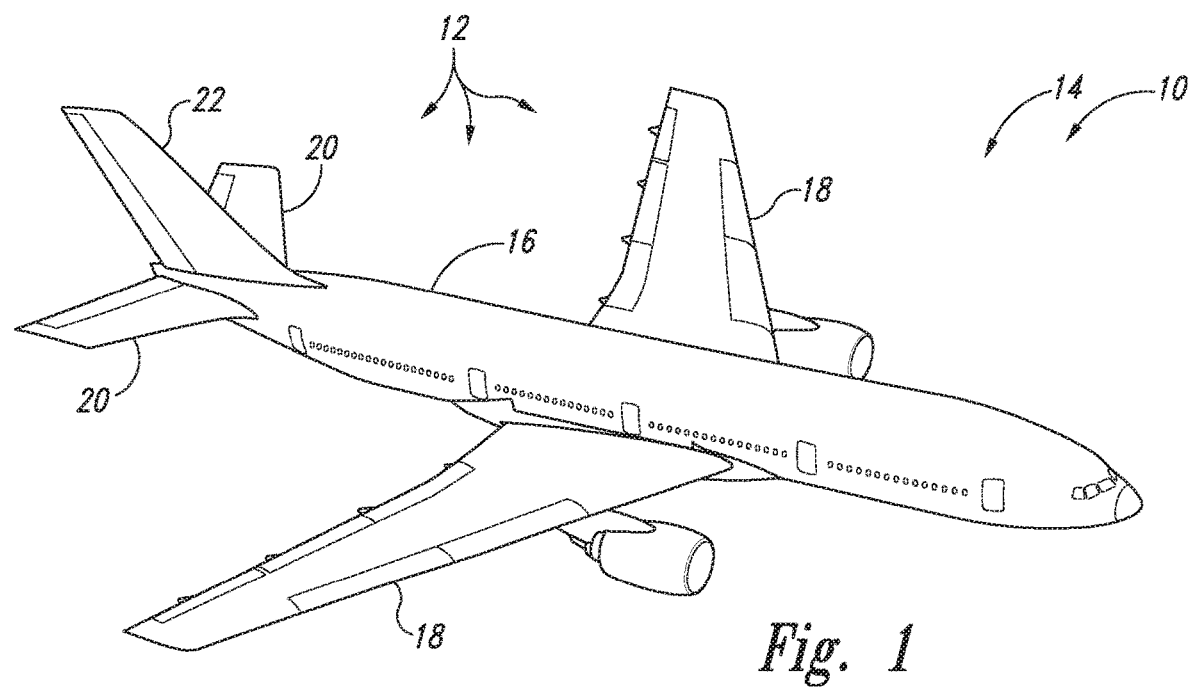
FIG. 1 is a perspective view of an illustrative, non-exclusive example of an apparatus including composite structures having complex composite plies, the apparatus in the form of an aircraft.

Methods and systems for constructing complex composite structures, as well as apparatuses having complex composite structures, are disclosed herein. In FIG. 1, an example of an apparatus 10 that may include complex composite structures 12 is provided in the form of an aircraft 14; however, other apparatuses 10 are within the scope of the present disclosure, and the present disclosure is not limited to aircraft and aircraft applications. For example, as illustrative, non-exclusive examples, other apparatuses 10 that may include complex composite structures 12 include (but are not limited to) spacecraft, watercraft, land vehicles, wind turbines, structural towers and masts, etc. Moreover, aircraft 14 may take any suitable form, including commercial aircraft, military aircraft, private aircraft, or any other suitable aircraft. While FIG. 1 illustrates aircraft 14 in the form of a fixed wing aircraft, other types and configurations of aircraft are within the scope of aircraft 14 according to the present disclosure.

Aircraft 14 typically include a fuselage 16, which generally corresponds to the main body of the aircraft 14 for holding passengers, crew, cargo, and/or equipment, for example, depending on the particular configuration and/or function of an aircraft 14. Typically, although not required, the fuselage 16 of an aircraft 14 is elongate and somewhat cylindrical or tubular. Aircraft 14 also may include wings 18, horizontal stabilizers 20, and a vertical stabilizer 22. One or more of a fuselage 16, a wing 18, a horizontal stabilizer 20, a vertical stabilizer 22, a structural subsection thereof, and/or an interface between two or more of such structures may be constructed of and/or may be described as including a complex composite structure 12.

As used herein, a complex composite structure is a structure constructed of two or more layers of composite material and with at least two layers having different configurations. For example, at least two layers may have different shapes, different thicknesses, different orientations of fibers, or other different characteristics and/or properties. Illustrative, non-exclusive examples of composite materials that may define a layer of a complex composite structure include fiber reinforced composite materials. Fiber reinforced composite materials additionally or alternatively may be described as or referred to as fiber reinforced polymers, or plastics. As used herein, a fiber reinforced composite material should be understood to include at least an epoxy or other polymer or binding material together with fibers, such as (but not limited to) carbon fibers, boron fibers, para-aramid (e.g., Kevlar®) fibers, and/or other fibers. In some examples, a layer may include one or more plies of composite material. In some such embodiments, the plies may be pre-preg plies, which are layers, or sheets, of fibers that are pre-impregnated with the associated binding material.

Figure 2:
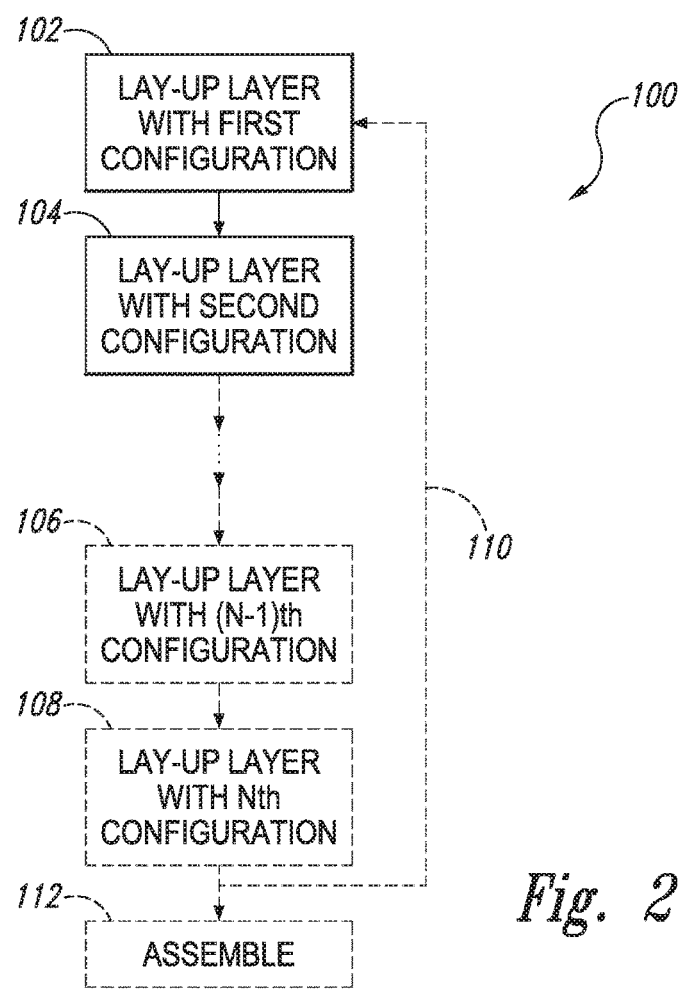
FIG. 2 is a flowchart schematically representing methods according to the present disclosure.

FIG. 2 provides a flowchart schematically representing illustrative, non-exclusive examples of methods 100 of constructing complex composite structures 12, FIG. 3 provides a schematic representation of illustrative, non-exclusive examples of systems 200 for constructing complex composite structures, and FIGS. 4-15 provide somewhat less schematic but still non-exclusive examples of stations that optionally may be associated with a system 200. Although not required in all embodiments, a system 200 may be configured to perform a method 100.

As schematically illustrated in FIG. 2, a method 100 includes at least a step 102 of laying up a first layer of composite material having a first configuration and a step 104 of laying up a second layer of composite material having a second configuration at least partially over the first layer to at least partially construct a complex composite structure. However, any suitable number of layers may be stacked during a method 100, with at least two of such layers having different configurations, such that a complex composite structure, as defined herein, is constructed. This is schematically and optionally illustrated in FIG. 2 with a total of N layers being laid up, including a step 106 of laying up an (N−1)th layer with an (N−1)th configuration and a step 108 of laying up an Nth layer with an Nth configuration, with N being an integer corresponding to a specific number of layers to be stacked to define a desired complex composite structure.

As schematically indicated in FIG. 2 at 110, the laying up of layers may be repeated to construct more than one complex composite structure, with the multiple complex composite structures subsequently being assembled to define an apparatus, as indicated at 112. A method 100 additionally and optionally may include one or more of a step of transferring the complex composite structure to a cure tool, a step of transferring the complex composite structure to a forming tool, which may or may not be the same as the cure tool, and a step of curing the complex composite structure, with these steps optionally occurring prior to subsequent assembly with other parts of an apparatus or following the assembly of at least a portion of an apparatus.

Turning now to FIG. 3, and as schematically represented, systems 200 for constructing complex composite structures include a conveyor 202 and two or more stations 204 that are operatively and sequentially positioned relative to the conveyor and that are each configured to operatively deposit a layer of composite material on the conveyor. In FIG. 3, four optional stations are schematically illustrated, but any suitable number of stations may be provided, including two, three, four, or more than four stations, depending on the complex composite structure to be constructed. Moreover, at least two of the stations 204 are configured to operatively deposit layers of composite material having different configurations, but a system 200 also may include two or more stations that are configured to operatively deposit layers with the same configurations.

A conveyor 202 may take any suitable form such that it is configured to operatively receive a layer of composite material from a station 204. As an illustrative, non-exclusive example, a conveyor 202 may include a conveyor belt that is configured to operatively translate a layer of composite material from an upstream station to a downstream station. A conveyor 202 may be flat and/or may include a flat support, or layup, surface for operatively receiving layers of composite plies. A conveyor may be configured to translate layers of composite material generally in a straight line. Also within the scope of systems 200 are systems in which the conveyor is a fixed support structure, with the stations being configured to translate relative to the fixed support structure, or conveyor. However, a conveyor, as used herein, is not a cure tool, or cure mandrel, that defines a mold surface corresponding to a final structure or apparatus being constructed. Rather, systems 200 are used to create generally flat layups of composite material "off tool," with the layups then being transferred to a cure tool for subsequent curing and assembly with other components. Accordingly, a system 200 does not rely on a cure tool being available, and instead the cure tool can be used more efficiently, resulting in reduced assembly times and reduced costs associated with construction of composite structures and apparatuses.

In the schematic example of FIG. 3, a first station 204 is configured to deposit a first layer 212 of composite material operatively on the conveyor 202. Then, the first layer translates to a second station 204, or alternatively, the second station translates to the first layer. The second station is configured to deposit a second layer 214 at least partially over the first layer 212. FIG. 3 also schematically illustrates an optional third station 204 configured to deposit a third layer 216 at least partially over previous layers and an optional fourth station 204 configured to deposit a fourth layer 218 at least partially over previous layers.

In the schematic example of FIG. 3, the subsequent layers are illustrated as being smaller than the previous layers, but such sizing of layers is not required and is merely provided for illustration purposes only, for example, to schematically and visually present a layer at least partially beneath another layer. Moreover, the layers schematically illustrated in FIG. 3 may take any suitable shape, form, construction, and/or configuration, and the rectangular boxes are merely schematic in nature and do not limit the scope of layer shapes.

In some systems 200, as well as some methods 100, as discussed herein, two or more of the layers may have different configurations. In FIGS. 3-14, this is schematically illustrated by the differing shading of the various illustrated layers, which in some examples may correspond to the orientations of fibers associated with a layer of fiber reinforced composite material. Referring to FIG. 3, and as an illustrative, non-exclusive example only, a first layer 212 may include fibers that are longitudinally aligned with the conveyor, a second layer 214 may include fibers that are angled relative to the conveyor (e.g., at 45 degrees), a third layer 216 may include fibers that are generally perpendicular to the longitudinal axis of the conveyor, and a fourth layer may include fibers that are angled relative to the conveyor (e.g., at 45 degrees, but also 90 degrees relative to the fibers of the second layer). Other configurations also are within the scope of the present disclosure.

Stations 204 of systems 200 may be configured in any suitable manner to lay up a layer operatively on the conveyor, with FIGS. 4-14 providing illustrative, non-exclusive examples of stations 204.

FIG. 4 schematically illustrates a station 220 that includes a layer depositing machine 222 that is configured to deposit a layer 224 of composite material longitudinally along the conveyor 202 as the conveyor translates relative to the layer depositing machine 222. For example, the layer depositing machine may be configured to lay down a layer of composite material as the conveyor translates linearly relative to the layer depositing machine. Alternatively, in examples where the conveyor is a fixed support structure, the conveyor may be stationary, and the layer depositing machine may translate relative to the conveyor. In some examples, the layer depositing machine may be configured to deposit a layer of fiber reinforced composite material along the conveyor with fibers that are longitudinally aligned with the conveyor.

FIG. 5 schematically illustrates a station 226 that includes a layer depositing machine 228 that is configured to deposit a layer 230 of composite material laterally across the conveyor 202. For example, in some methods 100 and systems 200, the conveyor may pause while the layer depositing machine translates laterally across the conveyor and lays down a layer of composite material. In some examples, the layer depositing machine is configured to deposit a layer of fiber reinforced composite material laterally across the conveyor with fibers of the fiber reinforced composite material extending laterally across the conveyor.

Figure 6:
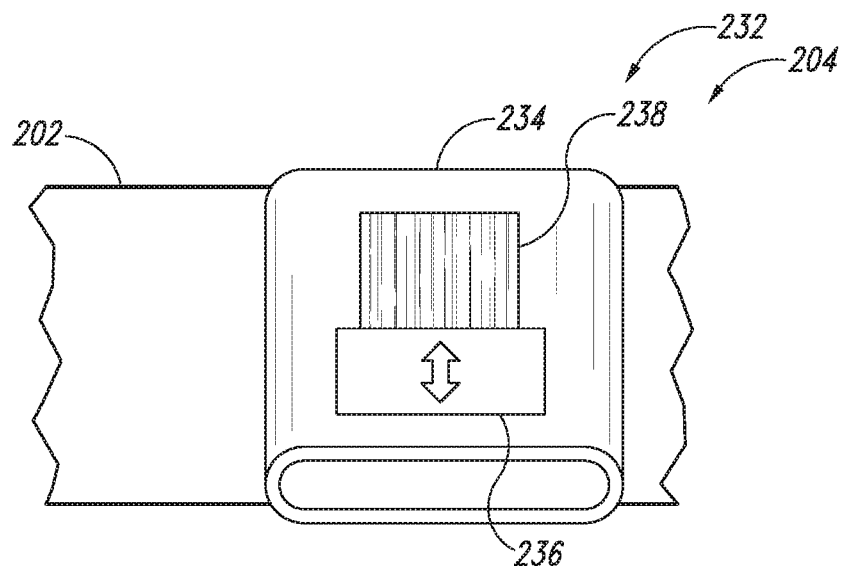
FIG. 6 is a schematic diagram representing another illustrative, non-exclusive example of a station for laying up a composite layer.
Figure 7:
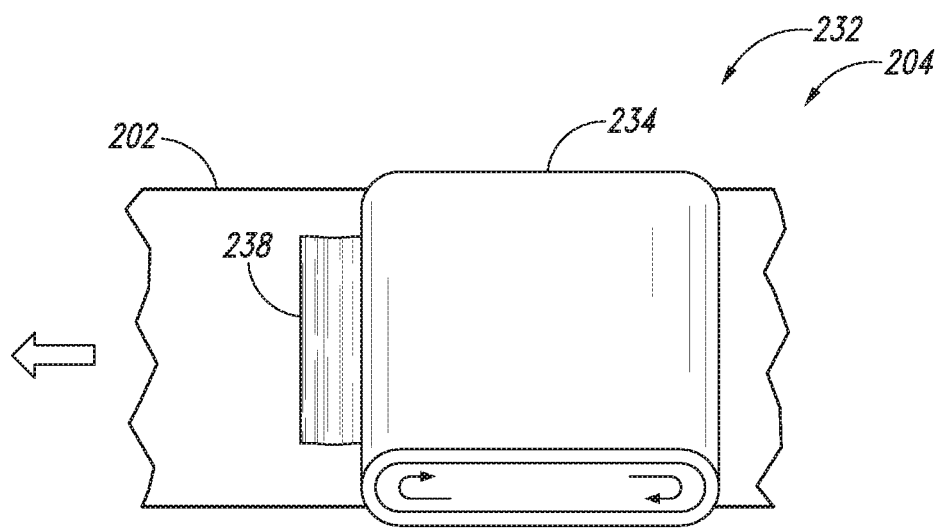
FIG. 7 is another schematic diagram representing the station of FIG. 6.

FIGS. 6-7 schematically illustrate a station 232 that includes a localized conveyor 234 and a layer depositing machine 236. The localized conveyor is operatively positioned above the primary conveyor 202 and is longitudinally aligned with the primary conveyor. The layer depositing machine is configured to deposit a layer 238 of composite material laterally across the localized conveyor. As schematically illustrated in FIG. 7, the localized conveyor is configured to operatively transfer the layer 238 of composite material from the localized conveyor to the primary conveyor. In some examples, the layer depositing machine is configured to deposit a layer of fiber reinforced composite material laterally across the localized conveyor with fibers of the fiber reinforced composite material extending laterally across the primary conveyor.

Figure 8:
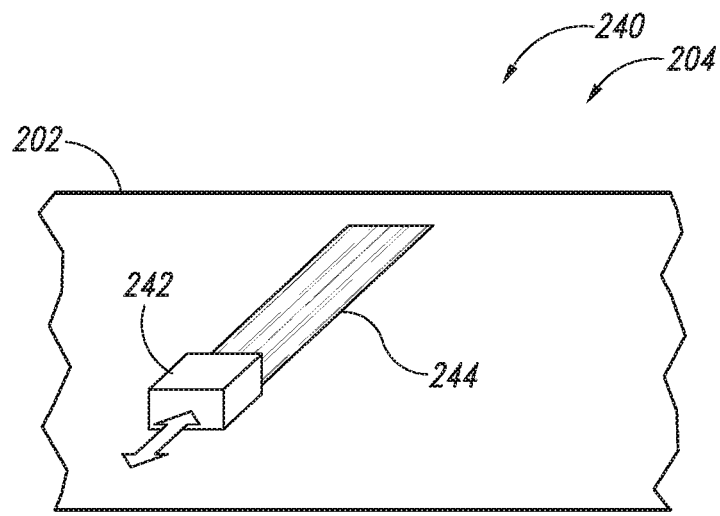
FIG. 8 is a schematic diagram representing another illustrative, non-exclusive example of a station for laying up a composite layer.

FIG. 8 schematically illustrates a station 240 that includes a layer depositing machine 242 that is configured to deposit a layer 244 of composite material across the conveyor 202 at an angle relative to a longitudinal axis of the conveyor. By "at an angle," it is meant that the layer depositing machine is configured to lay down the layer at an angle other than a right angle or longitudinally aligned with the conveyor, that is, at an angle between zero and ninety degrees. Illustrative, non-exclusive examples of angles includes those in the ranges of one or more of 0-180, 90-180, 100-170, 110-160, 120-150, 130-140, 0-90, 10-80, 20-70, 30-60, or 40-50 degrees relative to the longitudinal axis of the conveyor. In some methods 100 and systems 200, the conveyor may pause while the layer depositing machine translates transversely across the conveyor at an angle and lays down a layer of composite material. In other methods 100 and systems 200, the conveyor may continue to translate while the layer depositing machine translates transversely across the conveyor at an angle and lays down a layer of composite material. In some examples, the layer depositing machine is configured to deposit a layer of fiber reinforced composite material across the conveyor with fibers of the fiber reinforced composite material extending across the conveyor at an angle.

Figure 9:
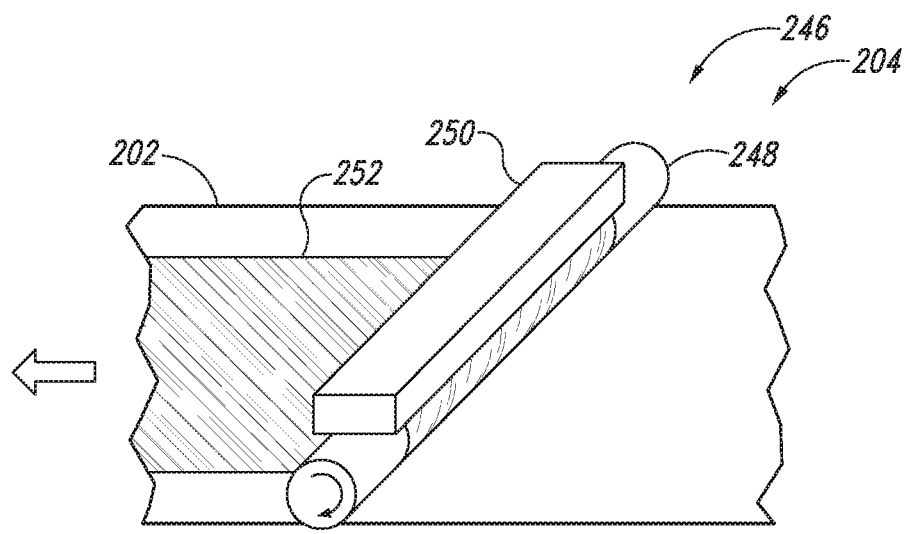
FIG. 9 is a schematic diagram representing another illustrative, non-exclusive example of a station for laying up a composite layer.

FIG. 9 schematically illustrates a station 246 that includes a localized roller 248 that is operatively positioned above the conveyor 202 at an angle relative to a longitudinal axis of the conveyor, and a layer depositing machine 250 that is configured to deposit a layer 252 of composite material across the localized roller. Moreover, the localized roller is configured to operatively transfer the layer of composite material from the localized roller to the conveyor, as schematically illustrated in FIG. 9. In some examples, the layer depositing machine is configured to deposit a layer of fiber reinforced composite across the localized roller with fibers of the fiber reinforced composite material extending laterally around the localized roller, for example, so that they extend at an angle relative to the conveyor when the layer is transferred to the conveyor from the localized roller.

Figure 10:
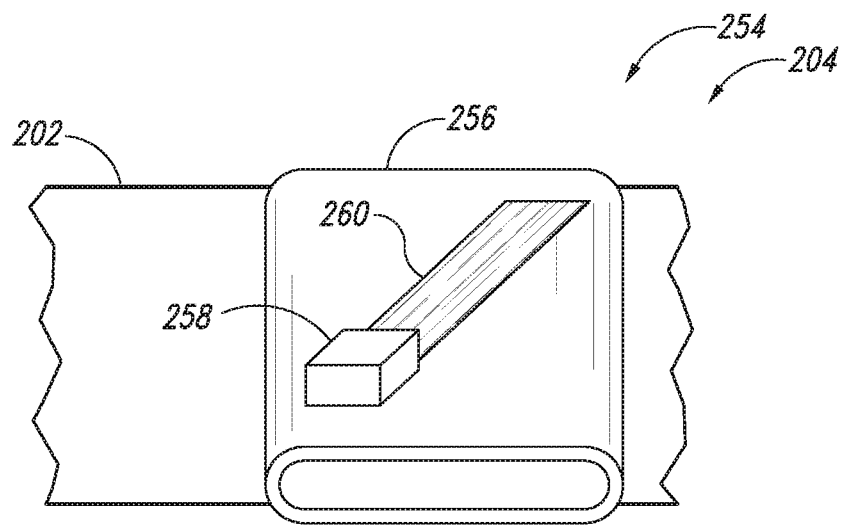
FIG. 10 is a schematic diagram representing another illustrative, non-exclusive example of a station for laying up a composite layer.
Figure 11:
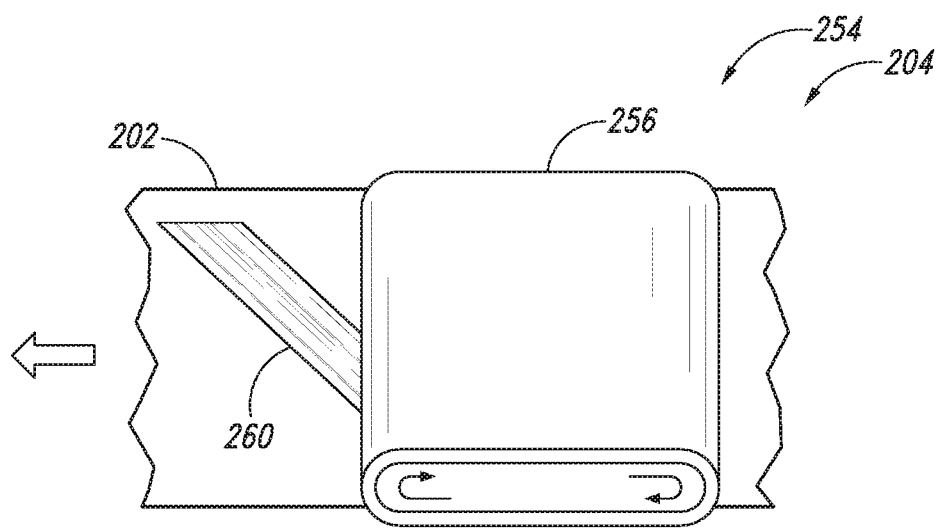
FIG. 11 is another schematic diagram representing the station of FIG. 10.

FIGS. 10-11 schematically illustrate a station 254 that includes a localized conveyor 256 operatively positioned above the primary conveyor 202 and longitudinally aligned with the primary conveyor, and a layer depositing machine 258 configured to deposit a layer 260 of composite material across the localized conveyor at an angle relative to a longitudinal axis of the primary conveyor. Moreover, the localized conveyor is configured to operatively transfer the layer of composite material from the localized conveyor to the primary conveyor, as schematically illustrated in FIG. 11. In some examples, the layer depositing machine is configured to deposit a layer of fiber reinforced composite material across the localized conveyor with fibers of the fiber reinforced composite material extending across the primary conveyor at an angle.

Figure 12:
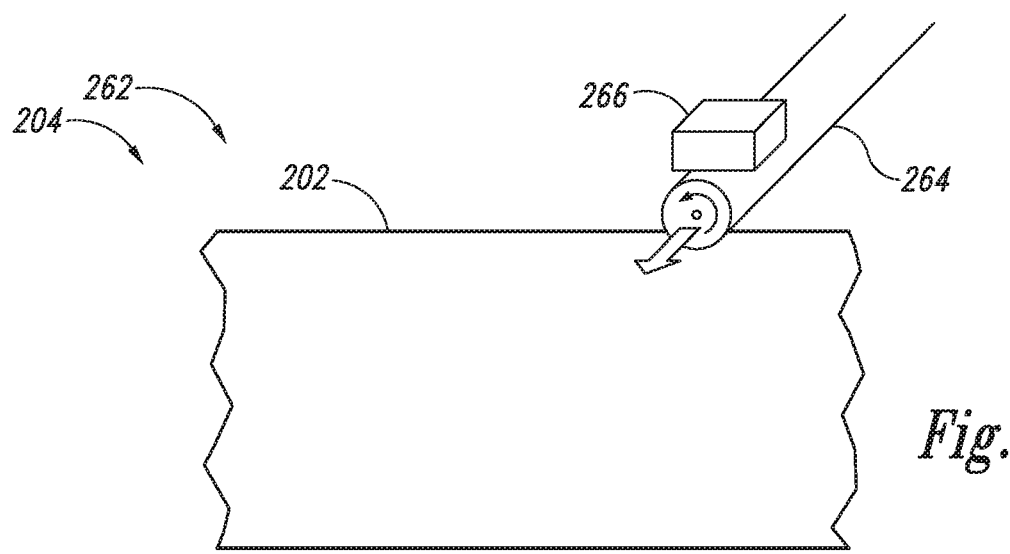
FIG. 12 is a schematic diagram representing another illustrative, non-exclusive example of a station for laying up a composite layer.
Figure 13:
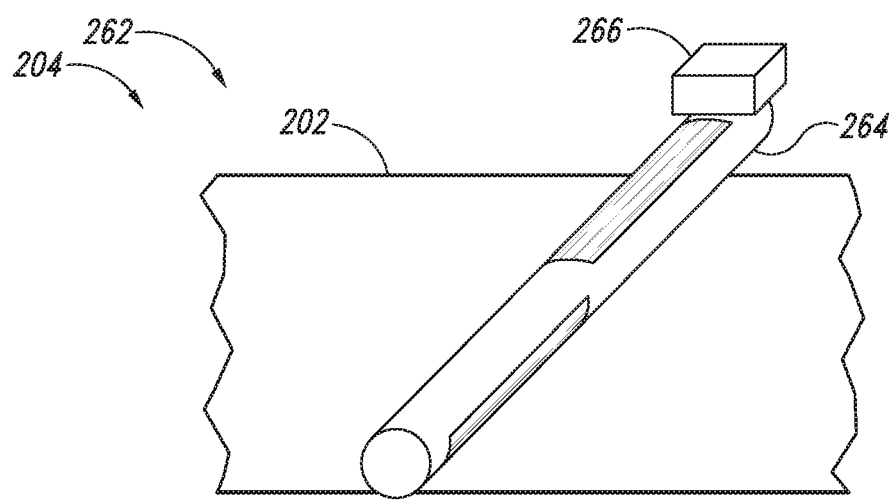
FIG. 13 is another schematic diagram representing the station of FIG. 12.
Figure 14:
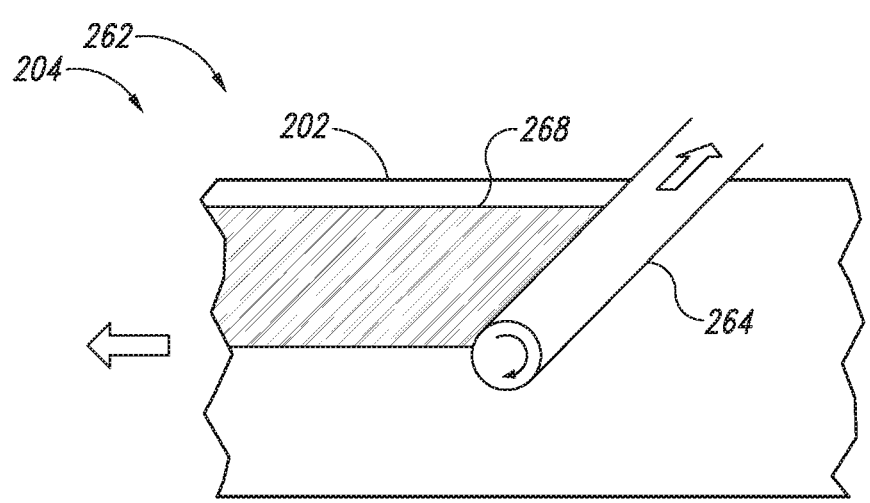
FIG. 14 is another schematic diagram representing the station of FIG. 12.

FIGS. 12-14 schematically illustrate a station 262 that includes a localized roller 264 operatively oriented at an angle relative to a longitudinal axis of the conveyor 202, and a layer depositing machine 266. The localized roller is configured to translate along its longitudinal axis to and from a position that is operatively above the conveyor, as schematically illustrated by the directional arrows in FIGS. 12 and 14. The layer depositing machine is configured to deposit a layer 268 of composite material across the localized roller as the localized roller translates to the position that is operatively above the conveyor. Additionally, the localized roller is configured to rotate in a first direction as it translates to the position that is operatively above the conveyor, as schematically indicated in FIG. 12, and to operatively transfer a layer of composite material from the localized roller to the conveyor as the localized roller rotates in a second direction opposite the first direction and translates away from the position that is operatively above the conveyor, as schematically indicated in FIG. 14. In some examples, the layer depositing machine is configured to deposit a layer of fiber reinforced composite material across the localized roller with fibers of the fiber reinforced composite material longitudinally aligned with the localized roller.

Figure 15:
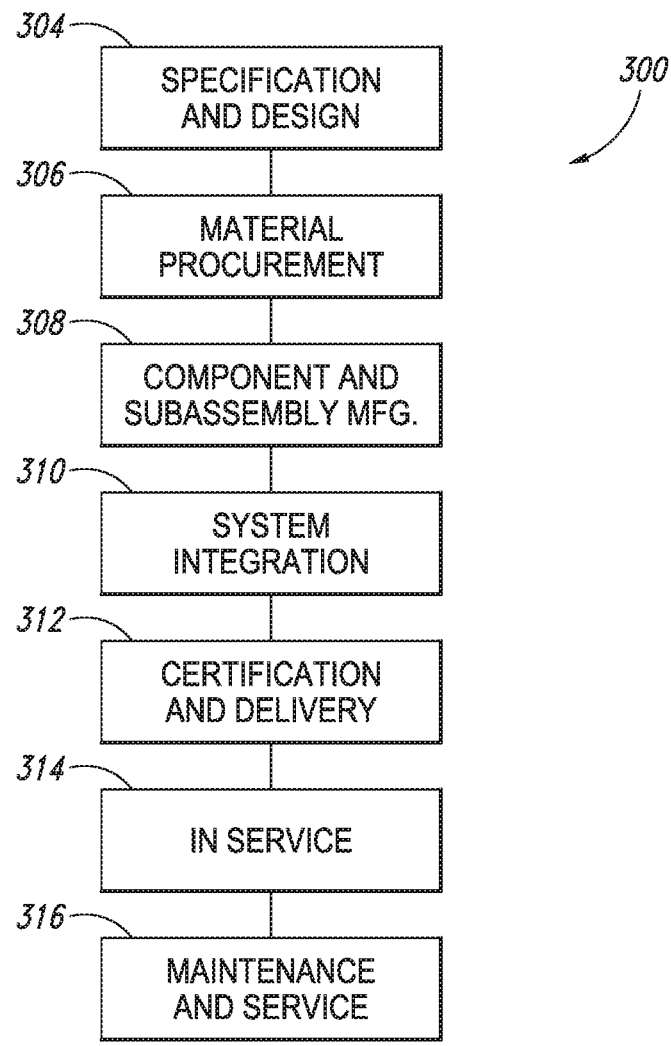
FIG. 15 is a flowchart schematically representing aircraft production and service methodology.
Figure 16:
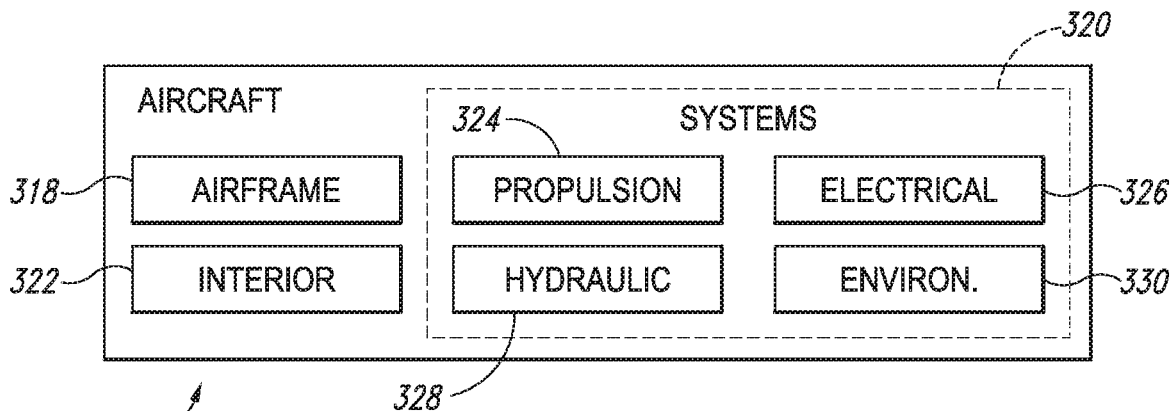
FIG. 16 is a block diagram schematically representing an aircraft.

Turning now to FIGS. 15-16, embodiments of the present disclosure may be described in the context of an aircraft manufacturing and service method 300 as shown in FIG. 15 and an aircraft 14 as shown in FIG. 16. During preproduction, exemplary method 300 may include specification and design 304 of the aircraft 14 and material procurement 306. During production, component and subassembly manufacturing 308 and system integration 310 of the aircraft 14 takes place. Thereafter, the aircraft 14 may go through certification and delivery 312 in order to be placed in service 314. While in service by a customer, the aircraft 14 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 16, the aircraft 14 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems also may be included. Although an aerospace example is shown, the principles of the inventions disclosed herein may be applied to other industries, such as the automotive industry.

Apparatus and methods disclosed herein may be employed during any one or more of the stages of the production and service method 300. For example, components or subassemblies corresponding to production process 308 may be fabricated or manufactured in a manner similar to components or subassemblies produced while the aircraft 14 is in service. Also, one or more apparatus embodiments, method embodiments, or a combination thereof may be utilized during the production stages 308 and 310, for example, by substantially expediting assembly of or reducing the cost of an aircraft 14. Similarly, one or more of apparatus embodiments, method embodiments, or a combination thereof may be utilized while the aircraft 14 is in service, for example and without limitation, during maintenance and service 316.

Illustrative, non-exclusive examples of inventive subject matter according to the present disclosure are described in the following enumerated paragraphs:

A. A method of constructing a complex composite structure, the method comprising:

laying up a first layer of composite material having a first configuration; and laying up a second layer of composite material having a second configuration at least partially over the first layer to at least partially construct the complex composite structure.

A1. The method of paragraph A, further comprising:

laying up an (N−1)th layer of one or more plies of composite material having an (N−1)th configuration; and laying up an Nth layer of one or more plies of composite material having an Nth configuration at least partially over the first layer to at least partially construct the complex composite structure, optionally wherein the configurations of at least two of the N layers differ from each other.

A2. The method of any of paragraphs A-A1, wherein the second configuration is different than the first configuration.

A3. The method of any of paragraphs A-A2, wherein the configurations are each defined by one or more of a shape, an orientation of fibers, a thickness, a material, a characteristic, and/or a property of the respective layer.

A4. The method of any of paragraphs A-A3, further comprising:

repeating the laying up the first layer and the laying up the second layer to construct more than one complex composite structure; and assembling the more than one complex composite structure to define an apparatus.

A5. The method of any of paragraphs A-A4, further comprising:

following the laying up the first layer and the laying up the second layer, curing the complex composite structure.

A6. The method of any of paragraphs A-A5, wherein the composite material includes fiber reinforced composite material, and optionally pre-preg composite material.

A7. The method of any of paragraphs A-A6, wherein one or more of the layers includes one or more plies of the composite material.

A8. The method of any of paragraphs A-A7, wherein the complex composite structure includes at least a portion of an aircraft fuselage, a wing section of an aircraft, a wing of an aircraft, a stabilizer section of an aircraft, a stabilizer of an aircraft, a structural section of an aircraft, and/or an aircraft.

A9. The method of any of paragraphs A-A8, wherein the method is performed utilizing the system of any of paragraphs B-B11.

B. A system for constructing complex composite structures, the system comprising:

a conveyor; and two or more stations operatively and sequentially positioned relative to the conveyor, wherein each station is configured to operatively deposit a layer of composite material on the conveyor to construct a complex composite structure.

B1. The system of paragraph B, wherein a downstream station of the two or more stations is configured to operatively deposit a layer of composite material at least partially over a layer of composite material operatively deposited on the conveyor by an upstream station of the two or more stations.

B2. The system of any of paragraphs B-B1, wherein the two or more stations include one or more stations that include:

a layer depositing machine configured to deposit a layer of composite material longitudinally along the conveyor as the conveyor translates relative to the layer depositing machine.

B2.1. The system of paragraph B2, wherein the layer depositing machine is configured to deposit a layer of fiber reinforced composite material along the conveyor with fibers of the fiber reinforced composite material longitudinally aligned with the conveyor.

B3. The system of any of paragraphs B-B2.1, wherein the two or more stations include one or more stations that include:

a layer depositing machine configured to deposit a layer of composite material laterally across the conveyor.

B3.1. The system of paragraph B3, wherein the layer depositing machine is configured to deposit a layer of fiber reinforced composite material laterally across the conveyor with fibers of the fiber reinforced composite material extending laterally across the conveyor.

B4. The system of any of paragraphs B-B3.1, wherein the conveyor is a primary conveyor and the two or more stations include one or more stations that include:

a localized conveyor operatively positioned above the primary conveyor and longitudinally aligned with the primary conveyor; and a layer depositing machine configured to deposit a layer of composite material laterally across the localized conveyor;

wherein the localized conveyor is configured to operatively transfer a layer of composite material from the localized conveyor to the primary conveyor.

B4.1. The system of paragraph B4, wherein the layer depositing machine is configured to deposit a layer of fiber reinforced composite material laterally across the localized conveyor with fibers of the fiber reinforced composite material extending laterally across the primary conveyor.

B5. The system of any of paragraphs B-B4.1, wherein the two or more stations include one or more stations that include:

a layer depositing machine configured to deposit a layer of composite material across the conveyor at an angle relative to a longitudinal axis of the conveyor, wherein the angle is 0-90, 10-80, 20-70, 30-60, or 40-50 degrees relative to the longitudinal axis of the conveyor.

B5.1. The system of paragraph B5, wherein the layer depositing machine is configured to deposit a layer of fiber reinforced composite material across the conveyor with fibers of the fiber reinforced composite material extending across the conveyor at the angle.

B6. The system of any of paragraphs B-B5.1, wherein the two or more stations include one or more stations that include:

a localized roller operatively positioned above the conveyor at an angle relative to a longitudinal axis of the conveyor, wherein the angle is 0-90, 10-80, 20-70, 30-60, or 40-50 degrees relative to the longitudinal axis of the conveyor; and a layer depositing machine configured to deposit a layer of composite material across the localized roller;

wherein the localized roller is configured to operatively transfer a layer of composite material from the localized roller to the conveyor.

B6.1. The system of paragraph B6, wherein the layer depositing machine is configured to deposit a layer of fiber reinforced composite across the localized roller with fibers of the fiber reinforced composite material extending laterally around the localized roller.

B7. The system of any of paragraphs B-B6.1, wherein the conveyor is a primary conveyor and the two or more stations include one or more stations that include:

a localized conveyor operatively positioned above the primary conveyor and longitudinally aligned with the primary conveyor; and a layer depositing machine configured to deposit a layer of composite material across the localized conveyor at an angle relative to a longitudinal axis of the primary conveyor, wherein the angle is 0-90, 10-80, 20-70, 30-60, or 40-50 degrees relative to the longitudinal axis of the primary conveyor;

wherein the localized conveyor is configured to operatively transfer a layer of composite material from the localized conveyor to the primary conveyor.

B7.1. The system of paragraph B7, wherein the layer depositing machine is configured to deposit a layer of fiber reinforced composite material across the localized conveyor with fibers of the fiber reinforced composite material extending across the primary conveyor at the angle.

B8. The system of any of paragraphs B-B7.1, wherein the two or more stations include one or more stations that include:

a localized roller operatively oriented at an angle relative to a longitudinal axis of the conveyor, wherein the angle is 0-90, 10-80, 20-70, 30-60, or 40-50 degrees relative to the longitudinal axis of the conveyor, and wherein the localized roller is configured to translate along its longitudinal axis to and from a position that is operatively above the conveyor; and a layer depositing machine configured to deposit a layer of composite material across the localized roller as the localized roller translates to the position that is operatively above the conveyor;

wherein the localized roller is configured to rotate in a first direction as it translated to the position that is operatively above the conveyor, and to operatively transfer a layer of composite material from the localized roller to the conveyor as the localized roller rotates in a second direction opposite the first direction and translates away from the position that is operatively above the conveyor.

B8.1. The system of paragraph B8, wherein the layer depositing machine is configured to deposit a layer of fiber reinforced composite material across the localized roller with fibers of the fiber reinforced composite material longitudinally aligned with the localized roller.

B9. The system of any of paragraphs B-B8.1, wherein the composite material includes fiber reinforced composite material, and optionally pre-preg composite material.

B10. The system of any of paragraphs B-B9, wherein the primary conveyor includes a flat layup surface for operatively receiving layers of composite material from the two or more stations.

B11. The system of any of paragraphs B-B10, wherein the complex composite structure includes at least a portion of an aircraft fuselage, a wing section of an aircraft, a wing of an aircraft, a stabilizer section of an aircraft, a stabilizer of an aircraft, a structural section of an aircraft, and/or an aircraft.

B12. The system of any of paragraphs B-B11, wherein the system is configured to facilitate and/or perform the method of any of paragraphs A-A9.

As used herein, the term "configured" means that the element, component, or other subject matter is designed and/or intended to perform a given function. Thus, the use of the term "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being configured to perform a particular function may additionally or alternatively be described as being adapted to perform that function. Similarly, subject matter that is recited as being configured to perform a particular function may additionally or alternatively be described as being operative to perform that function.

The various disclosed elements of systems and steps of methods disclosed herein are not required to all systems and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed system or method. Accordingly, such inventive subject matter is not required to be associated with the specific systems and methods that are expressly disclosed herein, and such inventive subject matter may find utility in systems and/or methods that are not expressly disclosed herein.

The invention claimed is:

1. A system, comprising:
a conveyor; and
two or more stations operatively and sequentially positioned relative to the conveyor, wherein each station is configured to operatively deposit a layer of fiber reinforced composite material on the conveyor to construct a complex composite structure, wherein the two or more stations include a first station that includes:
a first localized roller operatively positioned above the conveyor at a first non-right angle relative to a longitudinal axis of the conveyor; and
a first layer depositing machine configured to deposit a first layer of fiber reinforced composite material across the first localized roller;
wherein the first localized roller is configured to operatively transfer the first layer of fiber reinforced composite material from the first localized roller to the conveyor.

2. The system of claim 1, wherein the first layer depositing machine is configured to deposit the first layer of fiber reinforced composite material across the first localized roller with fibers of the first layer of fiber reinforced composite material extending laterally around the first localized roller.

3. The system of claim 1, wherein the first non-right angle is 40-50 degrees relative to the longitudinal axis of the conveyor.

4. The system of claim 1, wherein the first non-right angle is 45 degrees relative to the longitudinal axis of the conveyor.

5. The system of claim 1, wherein the two or more stations include a second station that includes:
a second localized roller operatively positioned above the conveyor at a second non-right angle relative to the longitudinal axis of the conveyor; and
a second layer depositing machine configured to deposit a second layer of fiber reinforced composite material across the second localized roller;
wherein the second localized roller is configured to operatively transfer the second layer of fiber reinforced composite material from the second localized roller to the conveyor.

6. The system of claim 5, wherein the second layer depositing machine is configured to deposit the second layer of fiber reinforced composite material across the second localized roller with fibers of the second layer of fiber reinforced composite material extending laterally around the second localized roller.

7. The system of claim 5, wherein the second non-right angle is 40-50 degrees relative to the longitudinal axis of the conveyor.

8. The system of claim 5, wherein the second non-right angle is 45 degrees relative to the longitudinal axis of the conveyor.

9. The system of claim 5, wherein the second non-right angle is 90 degrees relative to the first non-right angle.

10. The system of claim 5, wherein the two or more stations comprise a third station that is configured to operatively transfer a third layer of fiber reinforced composite material to the conveyor.

11. The system of claim 10,
wherein the first layer depositing machine is configured to deposit the first layer of fiber reinforced composite material across the first localized roller with fibers of the first layer of fiber reinforced composite material extending laterally around the first localized roller, so that when the first layer of fiber reinforced composite material is operatively transferred to the conveyor by the first localized roller, the fibers of the first layer of fiber reinforced composite extend at 90 minus the first non-right angle degrees relative to the longitudinal axis of the conveyor;
wherein the second layer depositing machine is configured to deposit the second layer of fiber reinforced composite material across the second localized roller with fibers of the second layer of fiber reinforced composite material extending laterally around the second localized roller, so that when the second layer of fiber reinforced composite material is operatively transferred to the conveyor by the second localized roller, the fibers of the second layer of fiber reinforced composite extend at 90 minus the second non-right angle degrees relative to the longitudinal axis of the conveyor; and
wherein the third station is configured to operatively transfer the third layer of fiber reinforced composite material to the conveyor so that fibers of the third layer of fiber reinforced composite material extend at a third angle other than 90 minus the first non-right angle degrees and 90 minus the second non-right angle degrees relative to the longitudinal axis of the conveyor.

12. The system of claim 11, wherein the first non-right angle is 45 degrees, wherein the second non-right angle is 45 degrees, and wherein the third angle is 90 degrees.

13. The system of claim 12, wherein the two or more stations comprise a fourth station that is configured to operatively transfer a fourth layer of fiber reinforced composite material to the conveyor so that fibers of the fourth layer of fiber reinforced composite material are longitudinally aligned with the longitudinal axis of the conveyor.

14. The system of claim 1, wherein the fiber reinforced composite material includes pre-preg composite material.

15. The system of claim 1, wherein the complex composite structure includes at least one of a portion of an aircraft fuselage, a wing section of an aircraft, a wing of an aircraft, a stabilizer section of an aircraft, a stabilizer of an aircraft, a structural section of an aircraft, and an aircraft.

16. A method of constructing a complex composite structure utilizing the system of claim 1, the method comprising:
laying up, with the first station, a first layer of fiber reinforced composite material having a first configuration; and
laying up, with a second station of the two or more stations, a second layer of fiber reinforced composite material having a second configuration at least partially over the first layer to at least partially construct the complex composite structure, wherein the second configuration is different than the first configuration.

17. A system, comprising:
a conveyor;
four stations operatively and sequentially positioned relative to the conveyor, wherein each station is configured to operatively deposit a layer of fiber reinforced composite material on the conveyor to construct a complex composite structure, wherein the four stations include:
a first station that includes (i) a first localized roller operatively positioned above the conveyor at 45 degrees relative to a longitudinal axis of the conveyor, and (ii) a first layer depositing machine configured to deposit a first layer of fiber reinforced composite material across the first localized roller with fibers of the first layer of fiber reinforced composite material extending laterally around the first localized roller, wherein the first localized roller is configured to operatively transfer the first layer of fiber reinforced composite material from the first localized roller to the conveyor so that the fibers of the first layer of fiber reinforced composite material extend at 45 degrees relative to the longitudinal axis of the conveyor;

a second station that includes (i) a second localized roller operatively positioned above the conveyor 45 degrees relative to the longitudinal axis of the conveyor and 90 degrees relative to the first localized roller, and (ii) a second layer depositing machine configured to deposit a second layer of fiber reinforced composite material across the second localized roller with fibers of the second layer of fiber reinforced composite material extending laterally around the second localized roller, wherein the second localized roller is configured to operatively transfer the second layer of fiber reinforced composite material from the second localized roller to the conveyor;

a third station configured to operatively transfer a third layer of fiber reinforced composite material to the conveyor so that fibers of the third layer of fiber reinforced composite material extend at 90 degrees relative to the longitudinal axis of the conveyor; and a fourth station configured to operatively transfer a fourth layer of fiber reinforced composite material to the conveyor so that fibers of the fourth layer of fiber reinforced composite material are longitudinally aligned with the longitudinal axis of the conveyor.

18. The system of claim 17, wherein the fiber reinforced composite material includes pre-preg composite material.

19. The system of claim 17, wherein the complex composite structure includes at least one of a portion of an aircraft fuselage, a wing section of an aircraft, a wing of an aircraft, a stabilizer section of an aircraft, a stabilizer of an aircraft, a structural section of an aircraft, and an aircraft.

20. A method of constructing a complex composite structure utilizing the system of claim 17, the method comprising:
  transferring, with the fourth station, the fourth layer of fiber reinforced composite material to the conveyor;
  transferring, with the first station, the first layer of fiber reinforced composite material to the conveyor at least partially over the fourth layer of fiber reinforced composite material;
  transferring, with the third station, the third layer of fiber reinforced composite material to the conveyor at least partially over the first layer of fiber reinforced composite material; and
  transferring, with the second station, the second layer of fiber reinforced composite material to the conveyor at least partially over the third layer of fiber reinforced composite material.

* * * * *